United States Patent
Rentschler (12)

(10) Patent No.: US 6,357,751 B1
(45) Date of Patent: Mar. 19, 2002

(54) PROTECTIVE ELEMENT FOR A SEALING ARRANGEMENT WITH AT LEAST ONE SEALING RING, SEALING ARRANGEMENT WITH SUCH A PROTECTIVE ELEMENT AS WELL AS METHOD FOR KEEPING AWAY DIRT PARTICLES FROM SUCH A SEALING ARRANGEMENT

(75) Inventor: Klaus Rentschler, Oberstenfeld (DE)

(73) Assignee: KACO GmbH & Co. (DE)

( * ) Notice: Subject to any disclaimer, the term of this patent is extended or adjusted under 35 U.S.C. 154(b) by 0 days.

(21) Appl. No.: 09/260,519

(22) Filed: Feb. 25, 1999

(30) Foreign Application Priority Data

Feb. 27, 1998 (DE) .......................................... 198 08 280

(51) Int. Cl.[7] ............................................... F16J 15/32
(52) U.S. Cl. ........................ 277/353; 277/361; 277/371
(58) Field of Search ................................ 277/307, 353, 277/361, 365, 366, 367, 371, 375, 376, 394, 402, 549, 562, 569

(56) References Cited

U.S. PATENT DOCUMENTS 5,137,285 A * 8/1992 Pick ........................ 277/562 X
5,456,475 A * 10/1995 Abraham et al. ....... 277/562 X
5,509,666 A * 4/1996 Abraham et al. ........... 277/562
6,095,925 A * 8/2000 Smith ..................... 277/562 X

* cited by examiner

Primary Examiner—Robert J. Sandy
Assistant Examiner—Karlena Schwing
(74) Attorney, Agent, or Firm—R. W. Becker & Associates; R. W. Becker

(57) ABSTRACT

A protective element for a sealing arrangement having at least one sealing ring has an annular bottom having an inner side and a radially outer side. A mantle portion is connected to the radially outer side. A cylindrical portion is connected to the radially inner side and has a central axis. The mantle portion and the cylindrical portion extend in opposite directions relative to the annular bottom. The cylindrical portion has a circumferential end face extending at least over a portion of the circumference at a slant relative to the central axis. Such a protective element prevents adhering of dust particles to the shaft and penetration of dust particles into the sealing arrangement.

25 Claims, 3 Drawing Sheets

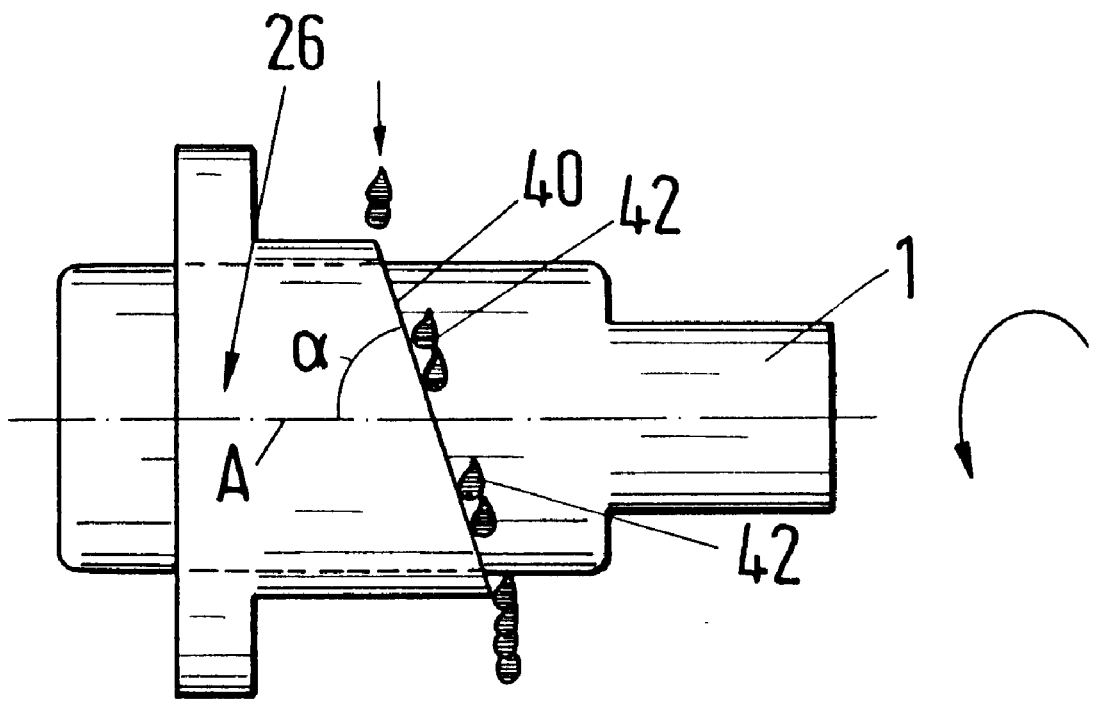

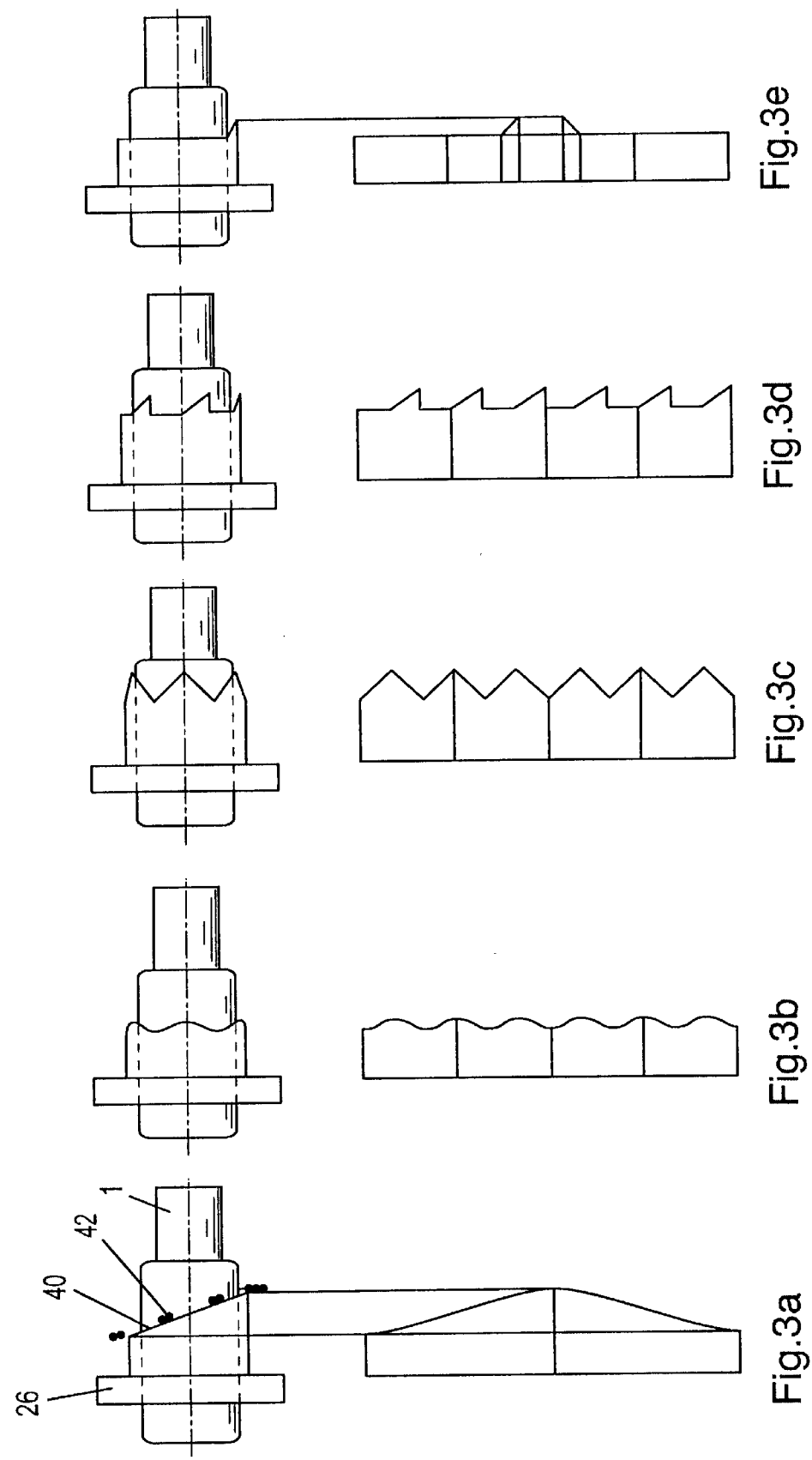

PROTECTIVE ELEMENT FOR A SEALING ARRANGEMENT WITH AT LEAST ONE SEALING RING, SEALING ARRANGEMENT WITH SUCH A PROTECTIVE ELEMENT AS WELL AS METHOD FOR KEEPING AWAY DIRT PARTICLES FROM SUCH A SEALING ARRANGEMENT

BACKGROUND OF THE INVENTION

The present invention relates to a protective element for a sealing arrangement with at least one sealing ring wherein the protective element has a bottom and a mantle portion through which the shaft to be sealed extends and wherein the bottom at the radially inner end has a cylindrical portion.

The invention further relates to a sealing arrangement for a shaft, preferably of a motor vehicle, comprising a protective element as disclosed above wherein at least one sealing ring is provided that is at least partially covered by the protective element. The invention also relates to a method for keeping away dirt particles from a sealing arrangement embodied as disclosed above.

For a rotatably driven and axially moveably shaft as used in motor vehicles, dirt particles will collect thereon when driving straight. When turning the steering wheel the dirt particles, will be pushed away because the shaft is axially moved. The protective element is cup-shaped and seated in front of the sealing arrangement. Fine dirt particles however can penetrate through this cup-shaped protective element into the sealing arrangement. When further dirt collects while driving straight, the dirt behind the protective element will be compressed and collected in a chamber. Upon multiple turning actions of the steering wheel, a deformation of the protective element or of the sealing arrangement will result.

It is therefore an object of the present invention to embody the aforementioned protective element, the aforementioned sealing arrangement as well as the aforementioned method such that dirt particles will not lead to an untimely breakdown of the protective element, respectively, the sealing arrangement.

SUMMARY OF THE INVENTION

This object is inventively solved for the aforementioned protective element in that the free end face of the cylindrical portion is, when viewed in an axial section, slanted relative to the axis of the cylindrical portion at least over a portion of its circumference.

The object is solved for the aforementioned sealing arrangement by such a protective element and for the aforementioned method by exerting a force during rotation of the shaft or of the shaft housing in a direction away from the sealing arrangement.

The protective element, according to the invention, is thus provided with a free end face of the cylindrical portion that at least over a portion of its circumference is slanted. Advantageously, the entire end face of the cylindrical portion is positioned at a slant to the axis of the cylindrical portion. When a rotation about 360° is performed, the developed view of this end face results in a sinus-shaped course. Because of the dynamic action of the rotation of the shaft or of the housing, the sinus-shaped course of the end face during driving causes a permanent axial pushing force which prevents the attachment of dirt particles on the shaft. In this manner it is reliably prevented that the protective element, respectively, the sealing arrangement will experience early failure.

BRIEF DESCRIPTION OF THE DRAWINGS

The object and advantages of the present invention will appear more clearly from the following specification in conjunction with the accompanying drawings, in which:

FIG. 2 shows in a schematic representation the protective element according to FIG. 1 in a side view.

FIGS. 3a, 3b, 3c, 3d, and 3e show details of the wave-shaped and saw-toothed features of the sealing lip.

DESCRIPTION OF PREFERRED EMBODIMENTS

Figure 1:
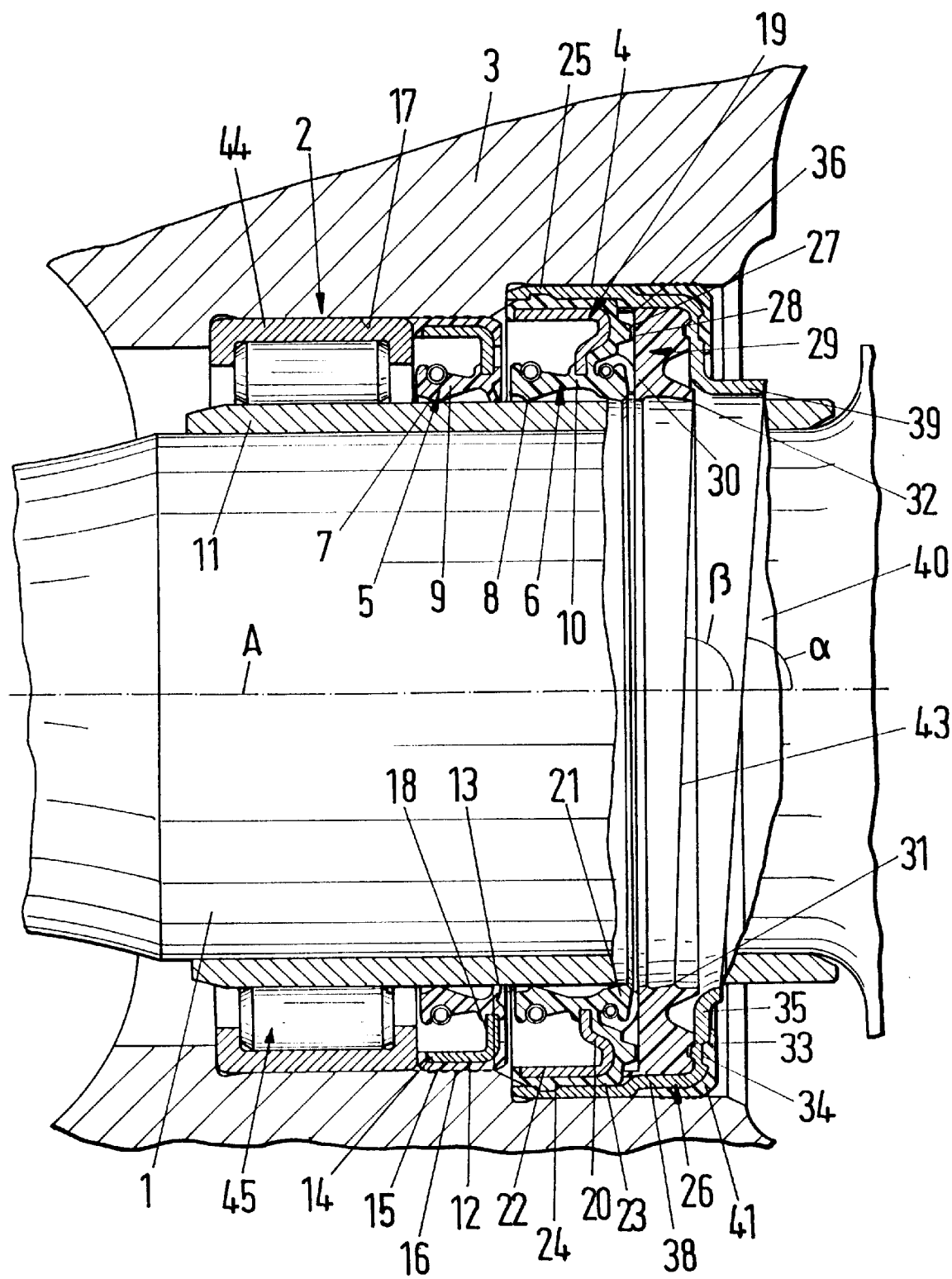
FIG. 1 shows an axial section the inventive protective element arranged at the inventive sealing arrangement.

The present invention will now be described in detail with the aid of several specific embodiments utilizing FIGS. 1 and 2.

FIG. 1 shows a shaft 1 of a motor vehicle which is sealed by a sealing arrangement 2. The free end of the shaft 1 is received in a housing 3 that has a receiving chamber 4 for the sealing arrangement 2. The sealing arrangement 2 comprises two axially adjacently arranged radial shaft sealing rings 5 and 6 which respectively rest with a sealing edge 7, 8 of a sealing lip 9, 10 on a bushing 11 that is fixedly connected to the shaft 1. The radial shaft sealing ring 6 has a greater outer diameter than the radial shaft sealing ring 5. Of course, the size of the radial shaft sealing ring depends on the specific mounting requirements so that the sealing rings may also have other dimensions. The sealing edges 7, 8 can also rest directly on the shaft 1.

The radial shaft sealing ring 5 has a housing 12 that in cross-section is substantially L-shaped and is comprised of metal or plastic. The radially inwardly oriented housing portion forms the bottom of the sealing ring to which the sealing lip 9 is vulcanized. It extends from the housing 12 in the direction toward the air side of the sealing arrangement 2. Connected to the sealing lip 9 is a dirt lip 13 that is advantageously a unitary part of the sealing lip 9.

The cylindrical housing part 14 that is arranged coaxially to the shaft 1 is provided at its exterior side with a coating 15 which advantageously has a wave-shaped profiling 16. In the mounted position of the radial shaft sealing ring 5 it rests at the inner wall 17 of the receiving chamber 4 under elastic deformation. The coating 15 covers also the free end face of the cylindrical housing part 14 and extends over a portion of the radial width of the underside of the housing bottom 18. The radial shaft sealing ring 6 has a housing 19 that in axial section is approximately L-shaped and is comprised of metal or plastic. In analogy to the sealing ring 5, the radial inner end of the housing bottom 20 has vulcanized thereto a sealing lip 10. It is advantageously a unitary part of the dirt lip 21 which rests in a similar manner as the dirt lip 13 of the sealing ring 5 at the bushing 11. The housing bottom 20 in axial section is approximately S-shaped.

The cylindrical housing part 22 is provided at its exterior side with a coating 23 which, like the coating 15 of the sealing ring 5, is comprised of an elastomeric material. It surrounds the free end face of the cylindrical housing part 22. The coating 23 is provided with a circumferentially projecting rib 24 which engages a circumferentially extending depression 25 of the protective element 26 which, in axial section, is L-shaped. The rib 24 and the depression 25 thus provide a positive-locking connection with which the radial shaft sealing ring 6 is positive-lockingly connected in the axial direction to the protective element 26. The rib 24 and the depression 25 are embodied such that the radial shaft sealing ring 6 can be inserted into the protective element 26 to such an extent that the rib 24 snaps into the depression 25. A removal of the radial shaft sealing ring 6 from the protective element 26 is only possible with respective tools.

The coating 23 extends also across a portion of the radial width of the housing bottom 20. This portion of the coating 23 has at least one axial projection 27 which in this case is annular and arranged coaxially to the axis of the sealing arrangement 2. Instead of the circumferential projection 27 it is also possible to provide a plurality of individual projections distributed about the circumference.

The projection 27 has a flat end face 28 at which an annular sealing element 29 with its planar underside 30 is positioned. The end face 28 and the underside 30 are positioned in radial planes of the sealing arrangement 2. The annular sealing element 29 has radially inwardly a sealing lip 31 with a sealing edge 32 which rests sealingly at the bushing 11.

The sealing element 29 has a thick portion in its radially outer area and at the side facing away from the radial shaft sealing ring 6 has a circumferential depression 33 which is engaged by a circumferential projection 34. It is provided at a radially extending bottom 35 of the protective element 26 and is preferably formed by a respective embossed portion. The sealing element 29 rests with its cylindrical mantle surface 36 at the inner wall 37 of the substantially cylindrical mantle portion 38 of the protective element 26.

The cylindrical mantle portion 38 has a radially inwardly offset portion having an inner wall 37 at which the sealing element 29 rests in the aforementioned manner. The radially outwardly projecting portion of the protective element covers the radial shaft sealing ring 6.

The protective element 26 that axially holds together the radial shaft sealing ring 6 and the sealing element 29 forms a protection with which during operation dirt particles can be kept away from the sealing arrangement 2, respectively, the sealing element 29. The radially extending annular bottom 35 of the protective element has its radially inner side a cylindrical portion 39 connected thereto that surrounds the bushing 11 under formation of a narrow annular gap. In order to realize the dirt-repelling effect, the end face 40 of the cylindrical portion 39 is slanted so that, in axial section according to FIG. 1, it is positioned at an angle a relative to the axis A of the sealing arrangement 2, respectively, of the shaft 1 that differs from a 90° angle. In a preferred embodiment the entire end face 40 of the cylindrical portion 39 is slanted so that the end face is located in a plane positioned at an angle a relative to the axis A. However, it is also possible to design the end face 40 in a wave-shape or sawtooth shape in the circumferential direction of the cylindrical portion 39 so that the respective end face sections are respectively differently slanted relative to the axis A, when viewed in axial section according to FIG. 1. It is also possible to embody the end face 40 of the protective element in a roof-shaped manner, when viewed in a side view. The tip of the thus designed end face 40 is then positioned, when viewed in a side view, on the axis of the protective element 26.

With the aid of FIG. 2 the function of the protective element 26 will be explained in more detail. The protective element 26 in FIG. 2 is represented schematically. It has a slanted end face 40 which along the circumference of the protective element is positioned in a plane extending at an angle a relative to the axis A. The shaft 1 rotates about its axis while the protective element 26 with its cylindrical mantle portion 38 rests at the inner wall of the receiving chamber 4 with interposition of an envelope 41 (FIG. 1). Upon press-fitting the protective element 26 into the receiving chamber 4, the radial shaft sealing ring 6 and the sealing element 29 are at the same time brought into their mounted position. Due to the slanted position of the end face 40 an incline results. It corresponds preferably to the amount of axial travel of the shaft 1. This travel will occur when the shaft 1, upon turning of the steering wheel and turning of the vehicle, is axially moved. Upon rotation of the shaft 1 by 360°, due to the slanted arrangement of the end face 40, dirt particles 42 adhering to the shaft 1 will be subjected to a force which acts according to a sinus-wave shape so that adhering of the dirt particles on the shaft 1 will be prevented. As shown in FIG. 2, upon axial movement of the shaft 1 and/or upon its rotation, the dirt particles 42 are displaced along the slanted end face 40 until they fall off the shaft 1. In this manner it is ensured that no dirt particles will penetrate the protective element 26 and reach the area of the sealing arrangement 2. The same effect is also observed when the end face 40 is wave-shaped or sawtooth-shaped.

In the latter cases, the axial forces acting on the dirt particles on the shaft 1 will be active multiple times during one rotation of the shaft so that the dirt particles will also be pushed away and will finally fall off the shaft 1.

This removal action can be further improved by also providing the sealing element 29 with an accordingly slanted end face 43 (FIG. 1). This end face 43 can be positioned over its circumference in a plane, which, an axial section, is positioned at an angle β relative to the axis A. The slant angle β can be identical to the slant angle α of the end face 40. The two slant angles however can also be different, for example, can be opposed to one another but also oriented in the same direction. If fine dust particles, despite the action of the protective element 26, have reached the sealing element 29 through this cylindrical portion 39, they will be removed as disclosed above upon axial movement and simultaneous rotation of the shaft 1 due to the slant angle β so that fine dirt particles cannot penetrate into the sealing arrangement 2. The end face 43 is provided at the sealing lip 31 of the sealing element 29 and can also have a wave-shaped, sawtooth-shape or a roof-shaped profiling.

The radial shaft sealing ring 5 rests with its side facing away from the radial shaft sealing ring 6 on an outer bearing ring 44 which is press-fitted into the receiving chamber 4 in the same manner as the sealing arrangement 2. The bearing ring 44 is a part of a roller bearing 45 with which the shaft 1 is rotatably supported. The balls of the ball bearing 45 rest at the bushing 11 which is manufactured of a suitable material. The ball bearing 45 is positioned axially secured within the housing 3. Due to the disclosed embodiment, a long service life of the sealing arrangement 2 is ensured because dirt cannot collect at the sealing arrangement, as is the case with conventional sealing arrangements, and an untimely failure of the sealing arrangement is thus prevented.

The disclosed function of the sealing arrangement can also be observed when the shaft does not rotate, i.e., is not an axle but the housing 3 rotates about the shaft 1.

The specification incorporates by reference the disclosure of German priority document 198 08 280.0 of Feb. 27, 1998.

The present invention is, of course, in no way restricted to the specific disclosure of the specification and drawings, but also encompasses any modifications within the scope of the appended claims.

What is claimed is:

1. A protective element (26) for a sealing arrangement, said protective element (26) comprising:

an annular bottom (35) having a radially inner side and a radially outer side;

a mantle portion (38) connected to said radially outer side;

a cylindrical portion (39) connected to said radially inner side and having a central axis (A);

said mantle portion (38) and said cylindrical portion (39) extending in opposite directions relative to said annular bottom (35);

said cylindrical portion (39) having a circumferential end face (40) extending at least over a portion of the circumference at a slant relative to said central axis (A), said cylindrical portion (39) having a mantle surface (36) which extends over the circumferential end face 40.

2. A protective element according to claim 1, wherein said end face (40) is positioned in a plane that extends at an angle that is not a right angle relative to said axis (A).

3. A protective element according to claim 1, wherein said free end face (4) is wave-shaped.

4. A protective element according to claim 1, wherein said free end face (4) is sawtooth-shaped.

5. A sealing arrangement, comprising:

a protective element (26) according to claim 1;

at least one sealing ring (5, 6), wherein said protective element (26) covers at least partially said at least one sealing ring (5, 6).

6. A sealing arrangement according to claim 5, wherein said end face (40) is positioned in a plane that extends at an angle that is not a right angle relative to said axis (A).

7. A sealing arrangement according to claim 5, wherein said free end face (4) is wave-shaped.

8. A sealing arrangement according to claim 5, wherein said free end face (4) is sawtooth-shaped.

9. A sealing arrangement according to claim 5, wherein said protective element (26) and a first one of said at least one sealing ring (6) are axially fixedly connected to one another.

10. A sealing arrangement according to claim 9, wherein said protective element (26) and said first sealing ring (6) are connected to one another in form-locking engagement.

11. A sealing arrangement according to claim 5, wherein said protective element (26) is press-fit into a receiving chamber (4) of a housing (3).

12. A sealing arrangement according to claim 11, wherein said housing (3) rotates and the shaft (1) is stationary.

13. A sealing arrangement according to claim 11, wherein said cylindrical portion (39) projects from the receiving chamber (4) toward an oil side of said sealing arrangement.

14. A sealing arrangement according to claim 5, further comprising a sealing element (29) positioned between said annular bottom of said protective element (26) and a first one of said at least one sealing ring (6).

15. A sealing arrangement according to claim 14, wherein said sealing element (29) has a sealing lip (31).

16. A sealing arrangement according to claim 15, wherein said sealing lip (31) has an end face (43) extending at least over a portion of a circumference of said end face (43) at a slant relative to said central axis (A).

17. A sealing arrangement according to claim 16, wherein said end face (43) of said sealing lip (31) is positioned in a plane that extends at an angle that is not a right angle relative to said axis (A).

18. A sealing arrangement according to claim 16, wherein said end face (43) of said sealing lip (31) is wave-shaped.

19. A sealing arrangement according to claim 16, wherein said end face (43) of said sealing lip (31) is sawtooth-shaped.

20. A sealing arrangement according to claim 16, wherein said end face (43) of said sealing lip (31) and said end face (40) of said cylindrical portion (39) have an identical slant angle ($\beta$) relative to said axis (A).

21. A sealing arrangement according to claim 16, wherein said end face (43) of said sealing lip (31) and said end face (40) of said cylindrical portion (39) have a different slant angle ($\alpha$, $\beta$) relative to said axis (A).

22. A sealing arrangement according to claim 5, wherein a first one (6) of said sealing rings is axially fixedly connected to said protective element (26) and wherein a second one (5) of said sealing rings is positioned at a side of said first sealing ring (6) facing away from said protective element (26).

23. A device having a sealing arrangement and a shaft, comprising:

a protective element (26) according to claim 1;

at least one sealing ring (5, 6), wherein said protective element (26) covers at least partially said at least one sealing ring (5, 6);

wherein said protective element (26) is press-fit into a receiving chamber (4) of a housing (3), wherein said shaft (1) rotates and the housing (3) is stationary, wherein an annular gap is disposed between said cylindrical portion (39) and said shaft, said sealing element having a sealing lip, said sealing lip (31) having an end face (43) extending at least over a portion of a circumference of said end face (43) at a slant relative to said central axis (A), said slant of said end face (43) of said sealing lip (31) corresponding to an axial travel of said shaft.

24. A method of keeping away dirt particles from a device according to claim 23, comprising the step of exerting a force on dirt particles (42) seated on the shaft (1) in a direction away from said sealing arrangement when the shaft (1) or the housing (3) is rotated.

25. A method according to claim 24, wherein the force is a pulsating force.

* * * * *